United States Patent
Wu et al.

(10) Patent No.: US 12,415,945 B1
(45) Date of Patent: Sep. 16, 2025

(54) SILICATE WATER-BASED DRILLING FLUID FOR COALBED METHANE WELLS AND APPLICATION THEREOF

(71) Applicant: Yangtze University, Jingzhou (CN)

(72) Inventors: Yu Wu, Jingzhou (CN); Chaowu Ni, Jingzhou (CN)

(73) Assignee: Yangtze University, Jingzhou (CN)

( * ) Notice: Subject to any disclaimer, the term of this patent is extended or adjusted under 35 U.S.C. 154(b) by 0 days.

(21) Appl. No.: 19/032,595

(22) Filed: Jan. 21, 2025

(51) Int. Cl.
| | |
|---|---|
| *C09K 8/16* | (2006.01) |
| *C09K 8/20* | (2006.01) |
| *C09K 8/24* | (2006.01) |
| *C09K 8/42* | (2006.01) |
| *C09K 8/44* | (2006.01) |
| *E21B 33/138* | (2006.01) |

(52) U.S. Cl.
CPC ............... *C09K 8/16* (2013.01); *C09K 8/206* (2013.01); *C09K 8/24* (2013.01); *C09K 8/426* (2013.01); *C09K 8/44* (2013.01); *E21B 33/138* (2013.01)

(58) Field of Classification Search
CPC . C09K 8/16; C09K 8/206; C09K 8/24; C09K 8/426; C09K 8/44; E21B 33/138
See application file for complete search history.

(56) References Cited

FOREIGN PATENT DOCUMENTS

| | | | | |
|---|---|---|---|---|
| CN | 101605964 A | | 12/2009 | |
| CN | 101605964 B | * | 8/2014 | ............ C09K 8/032 |
| CN | 104610941 A | * | 5/2015 | |

OTHER PUBLICATIONS

CNIPA, Notification of First Office Action for CN202411155406.7, Sep. 30, 2024.
Beiken Energy Group Co., Ltd. and Inner Mongolia Coal Exploration Group Drilling Engineering Co., Ltd. (Applicants), Replacement claims (allowed) of CN202411155406.7, Nov. 8, 2024.
CNIPA, Notification to grant patent right for invention in CN202411155406.7, Dec. 4, 2024.

* cited by examiner

*Primary Examiner* — Kumar R Bhushan
(74) *Attorney, Agent, or Firm* — Hemisphere Law, PLLC; Zhigang Ma

(57) ABSTRACT

A silicate water-based drilling fluid for coalbed methane wells and an application are provided. In terms of parts by weights, raw materials of the silicate water-based drilling fluid comprise: 100 parts of water, 1-3 parts of bentonite, 1-5 parts of pH regulator, 3-5 parts of silicate, 2-4 parts of silicate stabilizer, 0.1-0.15 parts of tackifier, 2-4 parts of filtrate reducer, 3-5 parts of auxiliary inhibitor, 1-2 parts of activator, 2-4 parts of plugging agent, and 2-4 parts of lubricant. The silicate water-based drilling fluid for coalbed methane wells has good rheological properties, filtration performance, plugging performance and lubrication performance under a low temperature environment, and is more suitable for coalbed methane well drilling operations.

3 Claims, No Drawings

SILICATE WATER-BASED DRILLING FLUID FOR COALBED METHANE WELLS AND APPLICATION THEREOF

CROSS-REFERENCE TO RELATED APPLICATION

This application claims priority to Chinese Patent Application No. 202411155406.7, filed Aug. 22, 2024, which is herein incorporated by reference in its entirety.

TECHNICAL FIELD

The disclosure relates to the field of oil and gas drilling engineering and oilfield chemistry technologies, and more particularly to a silicate water-based drilling fluid for coalbed methane wells and an application thereof.

BACKGROUND

Coalbed methane, as an important unconventional natural gas resource, has gradually attracted widespread attention due to its advantages of low pollution and high energy efficiency. During a drilling process of a coalbed methane well, due to high brittleness and poor lithification of coal rocks, and development of cleats and fractures, borehole collapse is very easy to occur during the drilling process, leading to downhole accidents, which result in a variety of problems such as an extended drilling cycle, increased cost, and the inability to reach a target depth. Drilling fluid is a most important fluid in the drilling process. In addition to carrying rock cuttings and lubricating the drill bit, a primary function of the drilling fluid is to maintain the stability of the wellbore. Although oil-based drilling fluid has excellent performance, its high cost and associated environmental concerns limit its application to coalbed methane drilling. A polymer drilling fluid system is generally used in the coalbed methane drilling. The polymer drilling fluid system has characteristics of a good rheology and a low filtration, and has been widely applied in the coalbed methane drilling. However, the polymer drilling fluid system does not completely solve the problem of borehole collapse in coal seams. With the continuous extension of a horizontal section of the coalbed methane drilling and the development of deep coalbed methane progresses, the problem of the borehole collapse in the coal seams becomes more prominent.

In order to solve the above problem, researchers have been dedicated to developing a new water-based drilling fluid system, in which a silicate water-based drilling fluid has attracted researchers' attention due to its unique chemical and physical properties. By using the gelation properties of silicate, a stable barrier can be formed on the formation wellbore and in the fractures, thereby providing good wellbore stability performance.

At present, a silicate water-based drilling fluid system is rarely researched for coalbed methane. Although a silicate system is widely recognized as a best water-based drilling fluid for preventing the borehole collapse, the silicate system has not become a mainstream water-based drilling fluid to prevent the borehole collapse. This is primarily because the stability of the silicate system and the problem of the borehole collapse are a complex contradiction that has not been effectively resolved.

Therefore, a silicate water-based drilling fluid for coalbed methane wells is provided. This ensures the stability of the silicate water-based drilling fluid system and improves plugging and collapse prevention effects, thereby solving the problem of the borehole collapse in the coalbed methane drilling. The silicate water-based drilling fluid for coalbed methane wells is of great significance to the field of oil and gas drilling engineering and oilfield chemistry technologies.

SUMMARY

Based on the above content, embodiments of the disclosure provide a silicate water-based drilling fluid for coalbed methane wells and an application thereof. The silicate water-based drilling fluid has characteristics of low cost, good stability, environmental friendliness, and strong plugging and collapse prevention capabilities, which can realize safe, environmental protection, economic, and efficient drilling operations of coalbed methane.

In order to achieve the above purposes, embodiments of the disclosure provide the following solutions.

One of the technical solutions of the disclosure, a silicate water-based drilling fluid for coalbed methane wells is provided. In terms of parts by weight, raw materials of the silicate water-based drilling fluid include: 100 parts of water, 1-3 parts of bentonite, 1-5 parts of pH regulator, 3-5 parts of silicate, 2-4 parts of silicate stabilizer, 0.1-0.15 parts of tackifier, 2-4 parts of filtrate reducer, 3-5 parts of auxiliary inhibitor, 1-2 parts of activator, 2-4 parts of plugging agent, and 2-4 parts of lubricant.

In terms of parts by mass, the pH regulator is a mixture of 40-60 parts of sodium hydroxide and 40-60 parts of potassium hydroxide, the silicate is at least one of sodium silicate and potassium silicate, and a modulus of the silicate is in a range of 2.85 to 3.40.

The other of the technical solutions of the disclosure, an application of the silicate water-based drilling fluid for coalbed methane wells in coalbed methane drilling engineering is provided.

Embodiments of the disclosure may achieve the following technical effects.

The silicate water-based drilling fluid for coalbed methane wells has strong alkalinity under the action of the pH regulator, and can ensure the stability of the silicate, thereby ensuring the stability of the drilling fluid under a synergistic action of the silicate stabilizer. The silicate water-based drilling fluid for coalbed methane wells has good rheological performance, filtration performance, plugging performance and lubrication performance under a low temperature environment, and is more suitable for coalbed methane well drilling operations.

The silicate water-based drilling fluid for coalbed methane wells of the disclosure has excellent plugging and collapse prevention performance. It can quickly prevent collapse of coal seams mainly through the following three aspects. First, after silicate components enter pores and micro-fractures of a coal rock formation with filtrate, the silicate components chemically react with humic acid components in the coal seams to form a high-strength gel, forming cementation on the coal rocks (similar to the manufacture of briquette). Second, the silicate reacts with mineral components such as calcium, magnesium, iron and aluminum of coal gangue in the coal seams to form precipitation, thereby plugging the pores and the micro-cracks, preventing filtrate from continuing to penetrate into a deep, and improving bearing strength to prevent the collapse. Third, after the activator provided in the drilling fluid enters the coal rock formation with the filtrate, the alkali will be quickly consumed through a hydrolysis reaction to promote a formation of the gel by the silicate itself. Combined with the above two formation factors, the activator will cement and plug cleats and fractures of the coal seams, thereby ensuring the stability of wellbore.

A pH of the silicate water-based drilling fluid for coalbed methane wells of the disclosure is greater than 11, a filtration rate is less than or equal to 4.0 milliliters (mL), a plugging percolation rate is less than or equal to 8.2 mL, a friction coefficient is less than 0.1, and a strength attenuation rate of the coal rocks is less than or equal to 25%. These properties provide assurance for safe and efficient drilling operations of coalbed methane wells.

DETAILED DESCRIPTION OF EMBODIMENTS

A detailed description of various illustrative embodiments of the disclosure is provided. The detailed description should not be construed as a limitation of the disclosure, but rather as a more detailed description of some aspects, features, and embodiments of the disclosure.

It should be understood that the terms described in the disclosure are only for describing special embodiments and are not intended to limit the disclosure. In addition, for a numerical range in the disclosure, it should be understood that each intermediate value between an upper limit and a lower limit of the range is also specifically disclosed. Each smaller range between any stated value or intermediate value within the stated range and any other stated value or intermediate value within the stated range is also included in the disclosure. The upper limit and lower limit of each smaller range can be included or excluded independently.

Unless otherwise specified, all technical and scientific terms used in this document have the same meanings as commonly understood by those skilled in the art of the disclosure. Although the disclosure only describes preferred methods and materials, any methods and materials similar or equivalent to those described herein may also be used in the implementation or testing of the disclosure. All references cited in this specification are incorporated by reference to disclose and describe methods and/or materials related to the cited literature. In the event of any conflict with any incorporated literature, the content of this specification shall prevail.

It will be apparent to those skilled in the art that various improvements and changes can be made to the specific embodiments of the description of the disclosure without departing from the scope or spirit of the disclosure. Other embodiments obtained from the description of the disclosure will be apparent to those skilled in the art. The description and embodiments of the disclosure are merely illustrative.

The terms "comprise", "include", "have", "contain" and so on used in the document are all open terms, meaning include but not limited to.

In the disclosure, the term "parts", unless otherwise specified, refers to parts by mass.

On one hand, the disclosure provides a silicate water-based drilling fluid for coalbed methane wells. In terms of parts by mass, raw materials of the silicate water-based drilling fluid include: 100 parts of water, 1-3 parts of bentonite, 1-5 parts of pH regulator, 3-5 parts of silicate, 2-4 parts of silicate stabilizer, 0.1-0.15 parts of tackifier, 2-4 parts of filtrate reducer, 3-5 parts of auxiliary inhibitor, 1-2 parts of activator, 2-4 parts of plugging agent, and 2-4 parts of lubricant.

In a specific embodiment of the disclosure, the bentonite is a commonly used bentonite in the drilling industry and is obtained through markets.

In the specific embodiment of the disclosure, the water, unless otherwise specified, is freshwater.

In some embodiments of the disclosure, the raw materials further include barite, and an addition amount of the barite is 0 to 50% of the weight of the water.

In some embodiments of the disclosure, in terms of parts by mass, the pH regulator is a mixture of 40-60 parts of sodium hydroxide and 40-60 parts of potassium hydroxide.

The sodium hydroxide can provide a strong alkaline environment for a system. On one hand, the sodium hydroxide can ensure the stability of the silicate. On the other hand, the raw materials can play a greatest role in the alkaline environment. In addition, the sodium hydroxide can prevent corrosion of drilling tools by acidic substances. The potassium hydroxide, in addition to the above functions, can also provide free potassium ions, and use mosaic effects of the potassium ions to improve performance of the drilling fluid in inhibiting clay hydration.

In some embodiments of the disclosure, the silicate is at least one of sodium silicate and potassium silicate, and a modulus of the silicate is 2.85 to 3.40.

The silicate infiltrates into pores and micro-fractures of coal seams, and forms a high-strength gel through a chemical reaction with humic acid contained in the coal seams, which is beneficial to cement wellbore, thereby preventing collapse and falling blocks. Furthermore, the coal seams contain a large amount of coal gangue, which includes minerals such as calcium, magnesium, iron, and aluminum. These minerals can also react with the silicate to form precipitates or gels, thus achieving plugging of the pores or the micro-fractures and stabilizing the wellbore.

In some embodiments of the disclosure, in terms of parts by mass, the silicate stabilizer is a mixture of 40-60 parts of sodium citrate and 40-60 parts of potassium citrate.

On one hand, the silicate stabilizer can further provide sodium and potassium ions to strengthen inhibition. On the other hand, both the sodium citrate and the potassium citrate have excellent anti-corrosion effects, which are beneficial in preventing corruption and spoilage of natural materials such as starch. In addition, citrate can chelate calcium and magnesium ions in water, which is beneficial to stability of the silicate and the auxiliary inhibitor in the system.

In some embodiments of the disclosure, in terms of parts by mass, the tackifier is a mixture of 30-40 parts of xanthan gum, 30-40 parts of scleroglucan and 20-40 parts of welan gum.

The xanthan gum, the scleroglucan and the welan gum are all microbial polysaccharide polymers. They also have good water solubility in cold water, and can play a role in increasing viscosity in a low temperature environment, significantly improving shear-thinning properties of a drilling fluid, which is beneficial for suspending and carrying rock cuttings and improving borehole cleaning effect. In addition, these biopolymers are natural non-toxic, environmentally friendly, biodegradable and renewable properties, which help to reduce environmental pollution.

In some embodiments of the disclosure, in terms of parts by mass, the filtrate reducer is a mixture of 10-20 parts of pregelatinized corn starch, 10-20 parts of pregelatinized potato starch, 10-20 parts of cassava starch and 40-70 parts of modified lignin.

In some embodiments of the disclosure, a preparation method of the modified lignin includes the following steps.

Step 1, 3-aminopropyltriethoxysilane is added to an ethanol-aqueous solution to perform a hydrolysis reaction, and lignin is added to perform a reaction to thereby obtain an intermediate product after completion of the hydrolysis reaction.

Step 2, the intermediate product and 1-ethyl-(3-dimethylaminopropyl) carbodiimide are added to a mixture of adipic anhydride and N,N-dimethylformamide, and a reaction is performed under an inert atmosphere to obtain the modified lignin.

In some embodiments of the disclosure, in the step 1, a volume concentration of the ethanol-aqueous solution is 90%. A mass ratio of the ethanol-aqueous solution to the 3-aminopropyltriethoxysilane is 200:(1-3), and a mass ratio of the 3-aminopropyltriethoxysilane to the lingin is (1-3):(15-20). A temperature of the hydrolysis reaction is 60° C., and a time of the hydrolysis reaction is 4 hours (h). A temperature of the reaction performed after adding the lignin is in a range of 70° C. to 80° C., a time of the reaction performed after adding the lignin is 10 h, and the reaction performed after adding the lignin is performed under a stirring condition. After the reaction performed by adding the lignin is complete, the step 1 further includes steps of cooling, reducing pressure to distill off solvent, washing, vacuum drying and grinding.

In some embodiments of the disclosure, in the step 2, a mass ratio of the lignin to the adipic anhydride is (15-20):(6-9). A mass ratio of the adipic anhydride to the N,N-dimethylformamide is (6-9):150, and a mass ratio of the lignin to the 1-ethyl-(3-dimethylaminopropyl) carbodiimide is (15-20):(0.5-1.0). The inert atmosphere is a nitrogen atmosphere. A temperature of the reaction is 80° C. to 90° C., and a time of the reaction is 6 h. After the reaction is complete, the step 2 further includes steps of cooling, reducing pressure to distill off remaining solvent, washing, followed by vacuum filtration, vacuum drying, and grinding.

In the disclosure, the filtrate reducer is composed of pregelatinized starch and the modified lignin. The pregelatinized starch is obtained by physical modification of natural starch, which has characteristics of non-toxic, biodegradable and renewable of the natural starch, and is beneficial to protect ecological environment. In addition, the pregelatinized starch can play a role in cold water to reduce filtration. The modified lignin prepared contains hydrophobic groups such as aromatic, ester and alkyl groups, and hydrophilic groups such as carboxyl, amide and hydroxyl groups. The modified lignin prepared has amphiphilic properties and is beneficial to adsorption in the pores and the micro-cracks of coal rocks and formation of a hydrophobic film, thereby preventing a further invasion of water and has significant filtration reduction effect.

A reason why the pregelatinized starch is mixed with the pregelatinized corn starch, the pregelatinized potato starch and the pregelatinized cassava starch: a single starch has its own advantages and disadvantages, while the mixture is beneficial to learn from each other and avoiding their own shortcomings.

In some embodiments of the disclosure, in terms of parts by mass, the auxiliary inhibitor is a mixture of 60-80 parts of potassium sulfate and 20-40 parts of sodium sulfate.

Potassium and sodium ions in the auxiliary inhibitor can inhibit the hydration of clay minerals in the formation, and sulfate radicals can react with calcium, magnesium, iron, aluminum and other high-valence ions in the formation to form precipitation, thereby plugging micro-pores and micro-fractures.

In some embodiments of the disclosure, in terms of parts by mass, the activator is a mixture of 40-60 parts of polylactic acid, 20-30 parts of polyhydroxybutyrate and 20-30 parts of polybutylene succinate.

In the disclosure, the activator mainly accelerates consumption of the alkali by producing organic acid through the hydrolysis reaction, promoting the formation of the silicate into a gel, thus playing an activation role. Due to a low content of the activator, under a strong alkaline environment generated by high concentration of the pH regulator, the consumption of the alkali will not cause the silicate to form the gel and affect the stability of the drilling fluid. However, after the activator enters the micro-pores and the micro-fractures of the formation with the drilling filtrate, the organic acid produced by the hydrolysis reaction will accelerate the consumption of alkalinity in the environment without adding the alkalinity to alkaline substances, which will then accelerate the formation of the gel from the silicate that also enters the formation, which is beneficial to rapidly strengthen the wellbore of the coal seams and effectively preventing collapse of the coal rocks.

In some embodiments of the disclosure, in terms of parts by mass, the plugging agent is a mixture of 30-40 parts of potassium humate, 10-20 parts of potassium fulvate, 30-40 parts of sodium humate and 10-20 parts of sodium fulvate.

In terms of parts by mass, the lubricant is a mixture of 30-40 parts of polyoxyethylene ether, 30-40 parts of polyether siloxane, 5-10 parts of polyoxyethylene linolenic acid ester and 15-30 parts of ricinoleic acid diethanolamide.

The silicate water-based drilling fluid for coalbed methane wells of the disclosure can be prepared by a conventional preparation method. For example, in terms of parts by mass, the silicate water-based drilling fluid for coalbed methane wells can be obtained by mixing the raw materials evenly.

On the other hand, the disclosure provides an application of the silicate water-based drilling fluid for coalbed methane wells in coalbed methane drilling engineering.

Unless otherwise specified, the raw materials used in an embodiment of the disclosure can be obtained through the markets.

In the embodiment of the disclosure, a specific gravity of the barite is 4.2 grams per cubic centimeter (g/cm$^3$), and an average particle size of the barite is 20 micrometers (μm).

The disclosure will be further described in the following embodiments.

Embodiment 1

A silicate water-based drilling fluid for coalbed methane wells, raw materials of which, in terms of parts by mass, are as follows:
water, 100 parts; bentonite, 1 part; pH regulator, 1 part; silicate, 3 parts; silicate stabilizer, 2 parts; tackifier, 0.1 parts; filtrate reducer, 2 parts; auxiliary inhibitor, 3 parts; activator, 1 part; plugging agent, 2 parts; lubricant, 2 parts; and barite, 0.

In terms of parts by mass, the pH regulator is a mixture of 40 parts of sodium hydroxide and 60 parts of potassium hydroxide. The silicate is sodium silicate, and a modulus of the silicate is 2.85.

In terms of parts by mass, the silicate stabilizer is a mixture of 40 parts of sodium citrate and 60 parts of potassium citrate.

In terms of parts by mass, the tackifier is a mixture of 30 parts of xanthan gum, 30 parts of scleroglucan and 40 parts of welan gum.

In terms of parts by mass, the filtrate reducer is a mixture of 10 parts of pregelatinized corn starch, 10 parts of pregelatinized potato starch, 10 parts of pregelatinized cassava starch and 70 parts of modified lignin.

A preparation method of the modified lignin includes the following steps.

Step 1, 200 parts of ethanol-aqueous solution with a volume concentration of 90% are added into a three-neck flask. Then 1 part of 3-aminopropyltriethoxysilane (APTES) is slowly added into the three-neck flask under a stirring condition, a temperature is raised to 60° C., and a hydrolysis reaction is performed for 4 h. Next, 15 parts of lignin are added into the three-neck flask, the temperature is raised to 70° C., and a reaction is performed under the stirring condition for 10 h. After the reaction is complete, heating is stopped and cooling by standing is carried out. Solvent is removed through reduced pressure distillation, followed by multiple washes with an anhydrous ethanol solution. Then an intermediate product is obtained through vacuum drying and grinding.

Step 2, 6 parts of adipic anhydride (ADAn) and 150 parts of N,N-dimethylformamide (DMF) are added into the three-neck flask. Then, under the stirring condition, nitrogen gas is introduced into the three-neck flask to remove oxygen, and then the intermediate product in the step 1 and 0.5 parts of 1-ethyl-(3-dimethylaminopropyl) carbodiimide (EDC) are added into the three-neck flask. After adding, the nitrogen gas is again introduced into the three-neck flask to remove the oxygen, and the temperature is slowly raised to 80° C. and reacted for 6 h to obtain a product. Then, the heating is stopped and the product is cooled by standing, remaining solvent is removed by vacuum distillation, and the product is washed multiple times with a dilute alkaline solution, followed by vacuum filtration, vacuum drying and grinding. Thus, dark brown powder is obtained as a target product, and the target product is the modified lignin.

In terms of parts by mass, the auxiliary inhibitor is a mixture of 60 parts of potassium sulfate and 40 parts of sodium sulfate.

In terms of parts by mass, the activator is a mixture of 40 parts of polylactic acid, 30 parts of polyhydroxybutyrate and 30 parts of polybutylene succinate.

In terms of parts by mass, the plugging agent is a mixture of 30 parts of potassium humate, 10 parts of potassium fulvate, 40 parts of sodium humate and 20 parts of sodium fulvate.

In terms of parts by mass, the lubricant is a mixture of 30 parts of polyoxyethylene ether, 30 parts of polyether siloxane, 10 parts of polyoxyethylene linolenic acid ester and 30 parts of ricinoleic acid diethanolamide.

A density of the silicate water-based drilling fluid prepared in the embodiment 1 is 1.05 g/cm$^3$, and a hot-rolling temperature of the silicate water-based drilling fluid is 30° C.

Embodiment 2

A silicate water-based drilling fluid for coalbed methane wells, raw materials of which, in terms of parts by mass, are as follows:
water, 100 parts; bentonite, 2 parts; pH regulator, 3 parts; silicate, 4 parts; silicate stabilizer, 3 parts; tackifier, 0.125 parts; filtrate reducer, 3 parts; auxiliary inhibitor, 4 parts; activator, 1.5 parts; plugging agent, 3 parts; lubricant, 3 parts; and barite, 7 parts.

In terms of parts by mass, the pH regulator is a mixture of 50 parts of sodium hydroxide and 50 parts of potassium hydroxide. The silicate is potassium silicate, and a modulus of the silicate is 3.10.

In terms of parts by mass, the silicate stabilizer is a mixture of 50 parts of sodium citrate and 50 parts of potassium citrate.

In terms of parts by mass, the tackifier is a mixture of 35 parts of xanthan gum, 35 parts of scleroglucan and 30 parts of welan gum.

In terms of parts by mass, the filtrate reducer is a mixture of 15 parts of pregelatinized corn starch, 15 parts of pregelatinized potato starch, 15 parts of pregelatinized cassava starch and 55 parts of modified lignin.

A preparation method of the modified lignin includes the following steps.

Step 1, 200 parts of ethanol-aqueous solution with a volume concentration of 90% are added into a three-neck flask. Then 2 parts of APTES is slowly added into the three-neck flask under a stirring condition, a temperature is raised to 60° C., and a hydrolysis reaction is performed for 4 h. Next, 17.5 parts of lignin are added into the three-neck flask, the temperature is raised to 75° C., and a reaction is performed under the stirring condition for 10 h. After the reaction is complete, heating is stopped and cooling by standing is carried out. Solvent is removed through reduced pressure distillation, followed by multiple washes with an anhydrous ethanol solution. Then an intermediate product is obtained through vacuum drying and grinding.

Step 2, 7.5 parts of AD An and 150 parts of DMF are added into the three-neck flask. Then, under the stirring condition, nitrogen gas is introduced into the three-neck flask to remove oxygen, and then the intermediate product in the step 1 and 0.75 parts of EDC are added into the three-neck flask. After adding, the nitrogen gas is again introduced into the three-neck flask to remove the oxygen, and the temperature is slowly raised to 85° C. and reacted for 6 h to obtain a product. Then, the heating is stopped and the product is cooled by standing, remaining solvent is removed by vacuum distillation, and the product is washed multiple times with a dilute alkaline solution, followed by vacuum filtration, vacuum drying and grinding. Thus, dark brown powder is obtained as a target product, and the target product is the modified lignin.

In terms of parts by mass, the auxiliary inhibitor is a mixture of 70 parts of potassium sulfate and 30 parts of sodium sulfate.

In terms of parts by mass, the activator is a mixture of 50 parts of polylactic acid, 25 parts of polyhydroxybutyrate and 25 parts of polybutylene succinate.

In terms of parts by mass, the plugging agent is a mixture of 35 parts of potassium humate, 15 parts of potassium fulvate, 35 parts of sodium humate and 15 parts of sodium fulvate.

In terms of parts by mass, the lubricant is a mixture of 35 parts of polyoxyethylene ether, 35 parts of polyether siloxane, 7.5 parts of polyoxyethylene linolenic acid ester and 22.5 parts of ricinoleic acid diethanolamide.

A density of the silicate water-based drilling fluid prepared in the embodiment 2 is 1.1 g/cm$^3$, and a hot-rolling temperature of the silicate water-based drilling fluid is 40° C.

Embodiment 3

A silicate water-based drilling fluid for coalbed methane wells, raw materials of which, in terms of parts by mass, are as follows:
water, 100 parts; bentonite, 3 parts; pH regulator, 5 parts; silicate, 5 parts; silicate stabilizer, 4 parts; tackifier, 0.15 parts; filtrate reducer, 4 parts; auxiliary inhibitor, 5 parts; activator, 2 parts; plugging agent, 4 parts; lubricant, 4 parts; and barite, 25 parts.

In terms of parts by mass, the pH regulator is a mixture of 60 parts of sodium hydroxide and 40 parts of potassium hydroxide.

In terms of parts by mass, the silicate is a mixture of 40 parts of sodium silicate and 60 parts of potassium silicate, and a modulus of the silicate is 3.40.

In terms of parts by mass, the silicate stabilizer is a mixture of 60 parts of sodium citrate and 40 parts of potassium citrate.

In terms of parts by mass, the tackifier is a mixture of 40 parts of xanthan gum, 40 parts of scleroglucan and 20 parts of welan gum.

In terms of parts by mass, the filtrate reducer is a mixture of 20 parts of pregelatinized corn starch, 20 parts of pregelatinized potato starch, 20 parts of pregelatinized cassava starch and 40 parts of modified lignin.

A preparation method of the modified lignin includes the following steps.

Step 1, 200 parts of ethanol-aqueous solution with a volume concentration of 90% are added into a three-neck flask. Then 3 parts of APTES is slowly added into the three-neck flask under a stirring condition, a temperature is raised to 60° C., and a hydrolysis reaction is performed for 4 h. Next, 20 parts of lignin are added into the three-neck flask, the temperature is raised to 80° C., and a reaction is performed under the stirring condition for 10 h. After the reaction is complete, heating is stopped and cooling by standing is carried out. Solvent is removed through reduced pressure distillation, followed by multiple washes with an anhydrous ethanol solution. Then an intermediate product is obtained through vacuum drying and grinding.

Step 2, 9 parts of ADAn and 150 parts of DMF are added into the three-neck flask. Then, under the stirring condition, nitrogen gas is introduced into the three-neck flask to remove oxygen, and then the intermediate product in the step 1 and 1.0 part of EDC are added into the three-neck flask. After adding, the nitrogen gas is again introduced into the three-neck flask to remove the oxygen, and the temperature is slowly raised to 90° C. and reacted for 6 h to obtain a product. Then, the heating is stopped and the product is cooled by standing, remaining solvent is removed by vacuum distillation, and the product is washed multiple times with a dilute alkaline solution, followed by vacuum filtration, vacuum drying and grinding. Thus, dark brown powder is obtained as a target product, and the target product is the modified lignin.

In terms of parts by mass, the auxiliary inhibitor is a mixture of 80 parts of potassium sulfate and 20 parts of sodium sulfate.

In terms of parts by mass, the activator is a mixture of 60 parts of polylactic acid, 20 parts of polyhydroxybutyrate and 20 parts of polybutylene succinate.

In terms of parts by mass, the plugging agent is a mixture of 40 parts of potassium humate, 20 parts of potassium fulvate, 30 parts of sodium humate and 10 parts of sodium fulvate.

In terms of parts by mass, the lubricant is a mixture of 40 parts of polyoxyethylene ether, 40 parts of polyether siloxane, 5 parts of polyoxyethylene linolenic acid ester and 15 parts of ricinoleic acid diethanolamide.

A density of the silicate water-based drilling fluid prepared in the embodiment 3 is 1.2 g/cm$^3$, and a hot-rolling temperature of the silicate water-based drilling fluid is 50° C.

Embodiment 4

A silicate water-based drilling fluid for coalbed methane wells, raw materials of which, in terms of parts by mass, are as follows:

water, 100 parts; bentonite, 2 parts; pH regulator, 1.5 parts; silicate, 3 parts; silicate stabilizer, 3 parts; tackifier, 0.11 parts; filtrate reducer, 3 parts; auxiliary inhibitor, 3 parts; activator, 1 part; plugging agent, 3 parts; lubricant, 3 parts; and barite, 38 parts.

In terms of parts by mass, the pH regulator is a mixture of 45 parts of sodium hydroxide and 55 parts of potassium hydroxide.

In terms of parts by mass, the silicate is a mixture of 50 parts of sodium silicate and 50 parts of potassium silicate, and a modulus of the silicate is 3.

In terms of parts by mass, the silicate stabilizer is a mixture of 55 parts of sodium citrate and 45 parts of potassium citrate.

In terms of parts by mass, the tackifier is a mixture of 40 parts of xanthan gum, 30 parts of scleroglucan and 30 parts of welan gum.

In terms of parts by mass, the filtrate reducer is a mixture of 10 parts of pregelatinized corn starch, 15 parts of pregelatinized potato starch, 15 parts of pregelatinized cassava starch and 60 parts of modified lignin.

A preparation method of the modified lignin includes the following steps.

Step 1, 200 parts of ethanol-aqueous solution with a volume concentration of 90% are added into a three-neck flask. Then 2.5 parts of APTES is slowly added into the three-neck flask under a stirring condition, a temperature is raised to 60° C., and a hydrolysis reaction is performed for 4 h. Next, 18.5 parts of lignin are added into the three-neck flask, the temperature is raised to 73° C., and a reaction is performed under the stirring condition for 10 h. After the reaction is complete, heating is stopped and cooling by standing is carried out. Solvent is removed through reduced pressure distillation, followed by multiple washes with an anhydrous ethanol solution. Then an intermediate product is obtained through vacuum drying and grinding.

Step 2, 8 parts of ADAn and 150 parts of DMF are added into the three-neck flask. Then, under the stirring condition, nitrogen gas is introduced into the three-neck flask to remove oxygen, and then the intermediate product in the step 1 and 0.9 parts of EDC are added into the three-neck flask. After adding, the nitrogen gas is again introduced into the three-neck flask to remove the oxygen, and the temperature is slowly raised to 88° C. and reacted for 6 h to obtain a product. Then, the heating is stopped and the product is cooled by standing, remaining solvent is removed by vacuum distillation, and the product is washed multiple times with a dilute alkaline solution, followed by vacuum filtration, vacuum drying and grinding. Thus, dark brown powder is obtained as a target product, and the target product is the modified lignin.

In terms of parts by mass, the auxiliary inhibitor is a mixture of 75 parts of potassium sulfate and 25 parts of sodium sulfate.

In terms of parts by mass, the activator is a mixture of 55 parts of polylactic acid, 25 parts of polyhydroxybutyrate and 20 parts of polybutylene succinate.

In terms of parts by mass, the plugging agent is a mixture of 30 parts of potassium humate, 20 parts of potassium fulvate, 30 parts of sodium humate and 20 parts of sodium fulvate.

In terms of parts by mass, the lubricant is a mixture of 30 parts of polyoxyethylene ether, 40 parts of polyether siloxane, 5 parts of polyoxyethylene linolenic acid ester and 25 parts of ricinoleic acid diethanolamide.

A density of the silicate water-based drilling fluid prepared in the embodiment 4 is 1.3 g/cm$^3$, and a hot-rolling temperature of the silicate water-based drilling fluid is 60° C.

Embodiment 5

A silicate water-based drilling fluid for coalbed methane wells, raw materials of which, in terms of parts by mass, are as follows:
water, 100 parts; bentonite, 2 parts; pH regulator, 2 parts; silicate, 5 parts; silicate stabilizer, 3 parts; tackifier, 0.1 parts; filtrate reducer, 3 parts; auxiliary inhibitor, 5 parts; activator, 1.5 parts; plugging agent, 4 parts; lubricant, 4 parts; and barite, 50 parts.

In terms of parts by mass, the pH regulator is a mixture of 45 parts of sodium hydroxide and 55 parts of potassium hydroxide.

In terms of parts by mass, the silicate is a mixture of 60 parts of sodium silicate and 40 parts of potassium silicate, and a modulus of the silicate is 3.20.

In terms of parts by mass, the silicate stabilizer is a mixture of 55 parts of sodium citrate and 45 parts of potassium citrate.

In terms of parts by mass, the tackifier is a mixture of 30 parts of xanthan gum, 40 parts of scleroglucan and 30 parts of welan gum.

In terms of parts by mass, the filtrate reducer is a mixture of 15 parts of pregelatinized corn starch, 10 parts of pregelatinized potato starch, 10 parts of pregelatinized cassava starch and 65 parts of modified lignin.

A preparation method of the modified lignin includes the following steps.

Step 1, 200 parts of ethanol-aqueous solution with a volume concentration of 90% are added into a three-neck flask. Then 1.5 parts of APTES is slowly added into the three-neck flask under a stirring condition, a temperature is raised to 60° C., and a hydrolysis reaction is performed for 4 h. Next, 16 parts of lignin are added into the three-neck flask, the temperature is raised to 77° C., and a reaction is performed under the stirring condition for 10 h. After the reaction is complete, heating is stopped and cooling by standing is carried out. Solvent is removed through reduced pressure distillation, followed by multiple washes with an anhydrous ethanol solution. Then an intermediate product is obtained through vacuum drying and grinding.

Step 2, 6.5 parts of AD An and 150 parts of DMF are added into the three-neck flask. Then, under the stirring condition, nitrogen gas is introduced into the three-neck flask to remove oxygen, and then the intermediate product in the step 1 and 0.7 parts of EDC are added into the three-neck flask. After adding, the nitrogen gas is again introduced into the three-neck flask to remove the oxygen, and the temperature is slowly raised to 82° C. and reacted for 6 h to obtain a product. Then, the heating is stopped and the product is cooled by standing, remaining solvent is removed by vacuum distillation, and the product is washed multiple times with a dilute alkaline solution, followed by vacuum filtration, vacuum drying and grinding. Thus, dark brown powder is obtained as a target product, and the target product is the modified lignin.

In terms of parts by mass, the auxiliary inhibitor is a mixture of 65 parts of potassium sulfate and 35 parts of sodium sulfate.

In terms of parts by mass, the activator is a mixture of 45 parts of polylactic acid, 30 parts of polyhydroxybutyrate and 25 parts of polybutylene succinate.

In terms of parts by mass, the plugging agent is a mixture of 40 parts of potassium humate, 10 parts of potassium fulvate, 40 parts of sodium humate and 10 parts of sodium fulvate.

In terms of parts by mass, the lubricant is a mixture of 30 parts of polyoxyethylene ether, 40 parts of polyether siloxane, 10 parts of polyoxyethylene linolenic acid ester and 20 parts of ricinoleic acid diethanolamide.

A density of the silicate water-based drilling fluid prepared in the embodiment 5 is 1.4 g/cm$^3$, and a hot-rolling temperature of the silicate water-based drilling fluid is 70° C.

Comparative Embodiment 1

In terms of parts by mass, a polymer potassium chloride water-based drilling fluid commonly used at a site is composed of raw materials as follows: 100 parts of water, 3 parts of bentonite, 0.5 parts of pH regulator (a mass ratio of sodium hydroxide to sodium carbonate is 1:1), 5 parts of potassium chloride, 0.3 parts of zwitterion polymer strong coating agent, 0.3 parts of high viscosity carboxymethyl cellulose, 3 parts of brown coal resin, 3 parts of modified vegetable oil and 25 parts of barite.

A density of the polymer potassium chloride water-based drilling fluid prepared in the comparative embodiment 1 is 1.2 g/cm$^3$, and a hot-rolling temperature of the polymer potassium chloride water-based drilling fluid is 50° C.

According to GB/T16783.1-2014 "Petroleum and Natural Gas Industry Drilling Fluid Field Testing Part 1: Water-based Drilling Fluids", drilling fluids prepared in the embodiments 1-5 and the comparative embodiment 1 are evaluated, and results are shown in Table 1.

TABLE 1

| comprehensive performance of the drilling fluids | | | | | | | | | | | | |
|---|---|---|---|---|---|---|---|---|---|---|---|---|
| drilling fluid | ρ | T | t | PV | YP | YP/PV | Φ3 | API | PPT | pH | EP | CRS |
| embodiment 1 | 1.05 | 30 | 72 | 15 | 11 | 0.73 | 7 | 4.0 | 8.2 | 11.1 | 0.0971 | 25.0 |
| embodiment 2 | 1.10 | 40 | 72 | 17 | 13 | 0.76 | 10 | 3.2 | 6.6 | 11.5 | 0.0926 | 15.0 |
| embodiment 3 | 1.20 | 50 | 72 | 22 | 18 | 0.82 | 12 | 2.1 | 4.8 | 12.1 | 0.0875 | 7.5 |
| embodiment 4 | 1.30 | 60 | 72 | 21 | 15 | 0.71 | 10 | 3.0 | 6.4 | 11.2 | 0.0922 | 17.5 |
| embodiment 5 | 1.40 | 70 | 72 | 24 | 17 | 0.71 | 9 | 2.3 | 5.0 | 11.3 | 0.0900 | 12.5 |
| comparative embodiment 1 | 1.20 | 50 | 72 | 33 | 9 | 0.27 | 5 | 6.0 | 12.2 | 8.6 | 0.0950 | 100.0 |

Notes: ρ, drilling fluid density, g/cm³; T, drilling fluid aging temperature, ° C.; t, drilling fluid rolling aging time, h; PV, drilling fluid plastic viscosity, milliPascal second (mPa·s); YP, drilling fluid dynamic yield strength, Pascal (Pa); YP/PV, yield point and plastic viscosity ratio, Pascal per milliPascal second (Pa/mPa s); Φ3, reading at 3rd speed of six-speed rotary viscometer, dimensionless; API, pressure filtration of drilling fluid (0.7 megapascal (MPa), ambient room, 30 minutes (min)), mL; PPT, permeation filtration of drilling fluid (6.9 MPa, T, 30 min), mL; pH, pH value of drilling fluid filtrate, dimensionless; EP, extreme pressure friction coefficient, dimensionless; and CRS, C strength attenuation rate of coal rocks (3.5 MPa, T, 72 h), %.

It can be seen from the embodiments 1-5 that the silicate water-based drilling fluid for coalbed methane wells has excellent rheological properties, filtration control performance, plugging performance, lubrication performance and collapse prevention performance in a density range of 1.05 g/cm³ to 1.40 g/cm³ and a temperature range of 30° C. to 70° C. after 72 hours of aging. According to the embodiment 3 and the comparative embodiment 1, compared to the polymer potassium chloride water-based drilling fluid commonly used at the site, the silicate water-based drilling fluid for coalbed methane wells has lower plastic viscosity and higher dynamic yield strength, showing better rock-carrying performance, and also shows better API filtration control and PPT plugging performance. Most importantly, in terms of the collapse prevention performance, the silicate water-based drilling fluid for coalbed methane wells performs significantly better. After 72 h of high-pressure soaking, a strength attenuation rate of coal rocks does not exceed 25%. As for the polymer potassium chloride water-based drilling fluid commonly used at the cite, the coal rocks are completely crushed after a same time of soaking, and a strength attenuation rate is 100%.

The five embodiments of the silicate water-based drilling fluid for coalbed methane wells of the disclosure, after aging for 72 h at different densities and temperatures, show the following characteristics: pH values are consistently greater than 11, ensuring the stability of the silicate; the rheological properties are good, and yield point and plastic viscosity ratios are generally greater than 0.70, indicating excellent rock-carrying performance; the API filtrations are low, generally not exceeding 4.0 mL; the PPT plugging performance is outstanding, which helps to reduce the filtration of liquid into the formation and prevent wellbore instability; coefficient of friction are not greater than 0.1, indicating good lubrication properties, which is beneficial for reducing torque and increasing drilling speed; the strength attenuation of coal rocks rate does not exceed 25%, showing significant collapse prevention effects, which is beneficial to stabilizing the coal rock wellbore and ensuring safe and efficient drilling operations in coalbed methane wells.

The embodiments described above are merely illustrative of the preferred embodiments of the disclosures and do not limit the scope of the disclosure. Any modifications and improvements made to the technical solutions of the disclosure by those skilled in the art, without departing from the spirit of the disclosure, should fall within the scope of protection as determined by the claims of the disclosure.

What is claimed is:

1. A silicate water-based drilling fluid for coalbed methane wells, wherein in terms of parts by weight, raw materials of the silicate water-based drilling fluid comprise: 100 parts of water, 1-3 parts of bentonite, 1-5 parts of pH regulator, 3-5 parts of silicate, 2-4 parts of silicate stabilizer, 0.1-0.15 parts of tackifier, 2-4 parts of filtrate reducer, 3-5 parts of auxiliary inhibitor, 1-2 parts of activator, 2-4 parts of plugging agent, and 2-4 parts of lubricant;

wherein in terms of parts by weight, the pH regulator is a mixture of 40-60 parts of sodium hydroxide and 40-60 parts of potassium hydroxide, the silicate is at least one of sodium silicate and potassium silicate, and a modulus of the silicate is in a range of 2.85 to 3.40;

wherein in terms of parts by weight, the silicate stabilizer is a mixture of 40-60 parts of sodium citrate and 40-60 parts of potassium citrate;

wherein in terms of parts by weight, the tackifier is a mixture of 30-40 parts of xanthan gum, 30-40 parts of scleroglucan and 20-40 parts of welan gum;

wherein in terms of parts by weight, the filtrate reducer is a mixture of 10-20 parts of pregelatinized corn starch, 10-20 parts of pregelatinized potato starch, 10-20 parts of pregelatinized cassava starch and 40-70 parts of modified lignin;

wherein a preparation method of the modified lignin comprises the following steps:

step 1, adding 3-aminopropyltriethoxysilane to an ethanol-aqueous solution to perform a hydrolysis reaction, and adding, after completion of the hydrolysis reaction, lignin to perform a reaction to thereby obtain an intermediate product; and step 2, adding the intermediate product and 1-ethyl-(3-dimethylaminopropyl) carbodiimide to a mixture of adipic anhydride and N,N-dimethylformamide, and reacting under an inert atmosphere to obtain the modified lignin;

wherein in the step 1, a mass ratio of the ethanol-aqueous solution to the 3-aminopropyltriethoxysilane is 200:(1-3), and a mass ratio of the 3-aminopropyltriethoxysilane to the lignin is (1-3):(15-20); a temperature of the hydrolysis reaction is 60° C., and a time of the hydrolysis reaction is 4 hours (h); a temperature of the reaction performed after adding the lignin is in a range of 70° C. to 80° C., and a time of the reaction performed after adding the lignin is 10 h; and wherein in the step 2, a mass ratio of the lignin to the adipic anhydride is (15-20):(6-9), a mass ratio of the adipic anhydride to the N,N-dimethylformamide is (6-9):150, and a mass ratio of the lignin to the 1-ethyl-(3-dimethylaminopropyl) carbodiimide is (15-20):(0.5-1.0); the inert atmosphere is a nitrogen atmosphere, a temperature of the reacting is in a range of 80° C. to 90° C., and a time of the reacting is 6 h;

wherein in terms of parts by weight, the auxiliary inhibitor is a mixture of 60-80 parts of potassium sulfate and 20-40 parts of sodium sulfate; and wherein in terms of parts by weight, the activator is a mixture of 40-60 parts of polylactic acid, 20-30 parts of polyhydroxybutyrate and 20-30 parts of polybutylene succinate.

2. The silicate water-based drilling fluid for the coalbed methane wells as claimed in claim 1, wherein the raw materials further comprise barite, and an addition amount of the barite is 0 to 50% of the weight of the water.

3. The silicate water-based drilling fluid for the coalbed methane wells as claimed in claim 1, wherein in terms of parts by weight, the plugging agent is a mixture of 30-40 parts of potassium humate, 10-20 parts of potassium fulvate, 30-40 parts of sodium humate and 10-20 parts of sodium fulvate; and wherein in terms of parts by weight, the lubricant is a mixture of 30-40 parts of polyoxyethylene ether, 30-40 parts of polyether siloxane, 5-10 parts of polyoxyethylene linolenic acid ester and 15-30 parts of ricinoleic acid diethanolamide.

\* \* \* \* \*